Oct. 11, 1932.  F. A. GERLING  1,881,471
HYDRAULIC VARIABLE SPEED GEARING
Filed Feb. 2, 1931  7 Sheets-Sheet 1

INVENTOR.
FRED A. GERLING,
BY Jerry G. Mathews

ATTORNEY.

Oct. 11, 1932.  F. A. GERLING  1,881,471

HYDRAULIC VARIABLE SPEED GEARING

Filed Feb. 2, 1931  7 Sheets-Sheet 3

INVENTOR.
FRED A. GERLING,
BY *[signature]*

ATTORNEY.

Oct. 11, 1932.  F. A. GERLING  1,881,471
HYDRAULIC VARIABLE SPEED GEARING
Filed Feb. 2, 1931  7 Sheets-Sheet 4

INVENTOR.
FRED A. GERLING,
BY *Jerry A. Mathews*
ATTORNEY.

Oct. 11, 1932.  F. A. GERLING  1,881,471
HYDRAULIC VARIABLE SPEED GEARING
Filed Feb. 2, 1931  7 Sheets-Sheet 7

INVENTOR.
FRED A. GERLING,
BY Jerry A. Mathews
ATTORNEY.

Patented Oct. 11, 1932

1,881,471

UNITED STATES PATENT OFFICE

FRED A. GERLING, OF BOISE, IDAHO

HYDRAULIC VARIABLE SPEED GEARING

Application filed February 2, 1931. Serial No. 513,024.

My invention relates to variable speed hydraulic transmission.

The invention provides a variable speed hydraulic transmission which is well adapted to be installed upon an automobile, for use in connection with the usual differential gearing. The apparatus is so constructed that practically any number of desired speeds are obtainable, in forward or reverse, and the speed changes may be effected smoothly and quietly. The operating parts of the apparatus are, preferably, enclosed within a fluid-tight casing, and are maintained thoroughly lubricated, and will operate practically indefinitely, without additional lubrication.

Means are also provided for suitably relieving the pressure upon the outlet side of the pump, during the changing of speeds, and also when the by-pass valve is opened or closed. The gearing is so constructed that the pressure from the pump unit may be utilized in breaking or stopping the engine unit. The pump or engine included in the apparatus may be used for other purposes, such as an air compressor, or vacuum pump.

In the accompanying drawings, forming a part of the specification, and in which like numerals are employed to designate like parts throughout the same.

Fig. 1ª is a side elevation of a treadle included in the apparatus.

Fig. 4ª is a radial section through one of the reciprocatory pistons, taken on line 4ª—4ª of Fig. 4ᵇ, Fig. 4ᵇ is an end elevation of the piston.

In the drawings, wherein for the purpose of illustration are shown preferred embodiments of my invention, attention being called, first, to Figs. 1 to 12, inclusive, the numeral 20 designates a closed casing adapted to hold a liquid, such as lubricating oil. Disposed within this casing are operating units 21 and 22, the operating unit 21 being operated as a pump, and the unit 22 being operated as a motor. These units are substantially identical and a detailed description of one will suffice for both. These units embody cylinders 23 and 24. The cylinder 23 is vertically arranged, while the cylinder 24 is horizontally arranged. Disposed within each cylinder is a rotor 25, having a rim 26, provided with side flanges 27, having slidable engagement with the adjacent casing. Suitable packing 28 is provided so that this sliding engagement may be fluid-tight. The rim 26 is of smaller diameter than the interior diameter of the casing, providing an annularly curved passage 29, for the travel of reciprocatory pistons 30 and 31. Each piston 30 or 31 is provided upon its sides and end with a groove slidably receiving packing strips 31', having openings for receiving pins 32', slightly larger than the pins to permit of restricted relative movements of the packing strips. The packing strips are urged outwardly by springs 33'. These pistons are arranged to slide radially within housings 32, and are moved by means of rods 33, provided at their inner ends with rollers 34, traveling within a groove cam element 35, held stationary. The function of the cam element 35 is to co-act with the rollers 34 and thereby project or retract the pistons, during their travel with the rotor.

The casing is provided with a stationary abutment 36 having curved contact faces 37. This abutment is provided with a radial recess 38, receiving a reciprocatory abutment element 39, having inclined faces 40, at its ends, for proper guiding action with the piston. The abutment element 39 is urged inwardly by means of compressible coil springs 41, engaging a removable closure plate 42 or the like, as shown. In connection with each operating unit, it will, therefore, be apparent that fluid under pressure is introduced into the casing upon one side of the abutment 36, and will drive the rotor, and will discharge from the casing, upon the opposite side of the abutment. The arrangement of the grooved cam 35 is such that each piston is properly retracted as it approaches the abutment, to slide over the inclined face 37. When traveling over the abutment element 39, a liquid-tight joint is effected between these engaging parts, due to the yielding action of the springs 41, the piston being again projected as it travels over the next inclined face 37.

Figure 1:
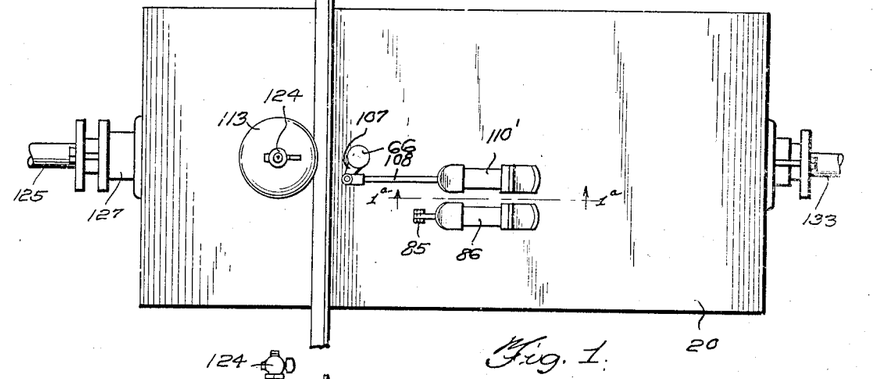
Fig. 1 is a plan view of apparatus embodying my invention.
Figure 1A:
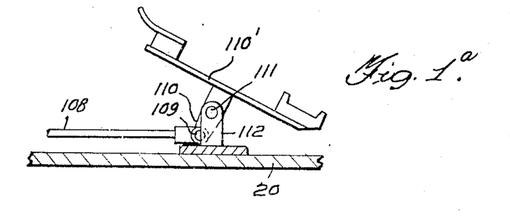
Figure 2:
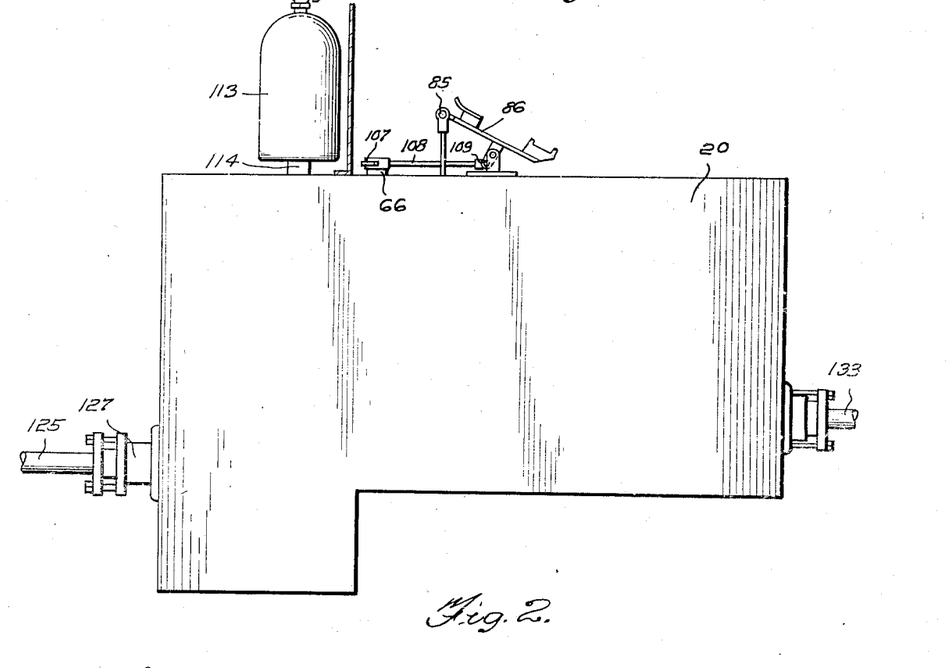
Fig. 2 is a side elevation of the same.
Figure 3:
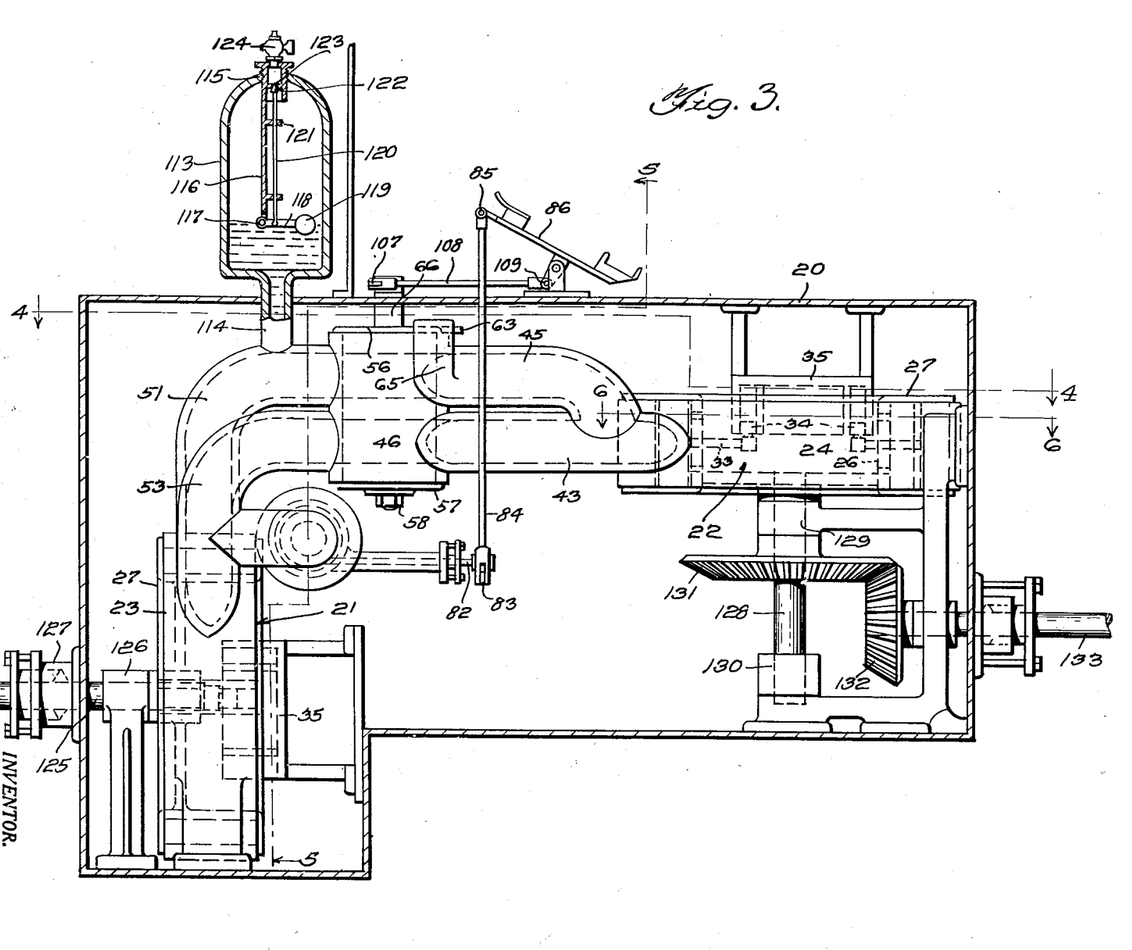
Fig. 3 is a central vertical longitudinal section through the casing of the apparatus, the operating elements herein being shown in elevation.
Figure 4:
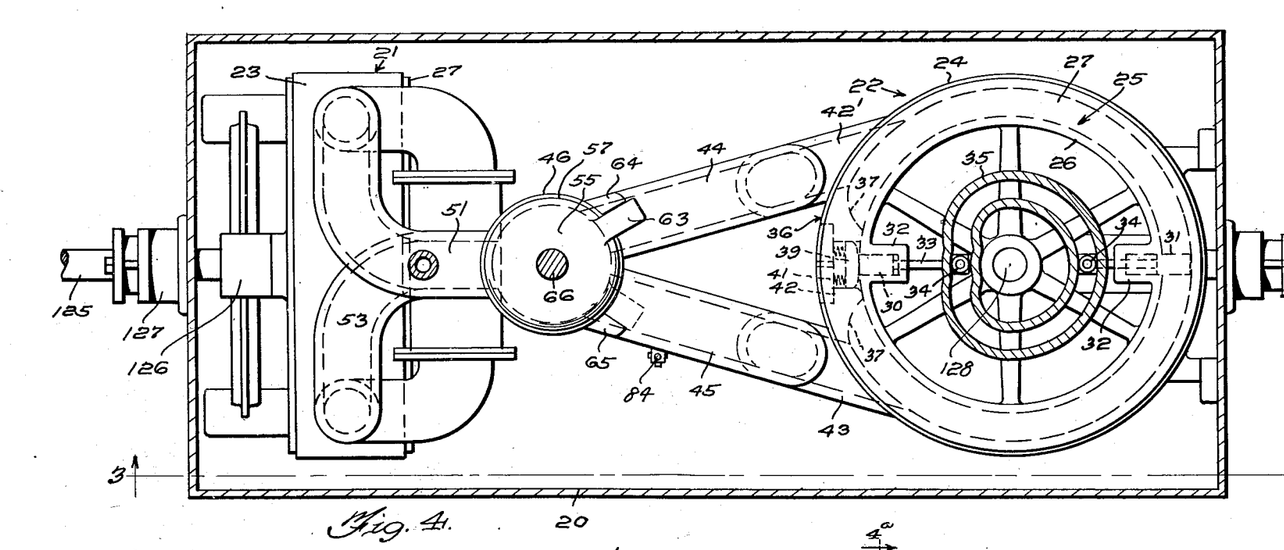
Fig. 4 is a horizontal section taken on line 4—4 of Fig. 3.
Figure 4A:
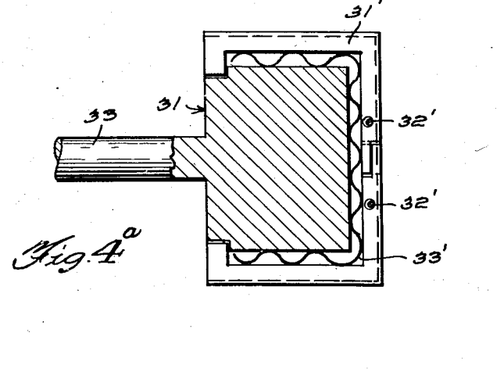
Figure 4B:
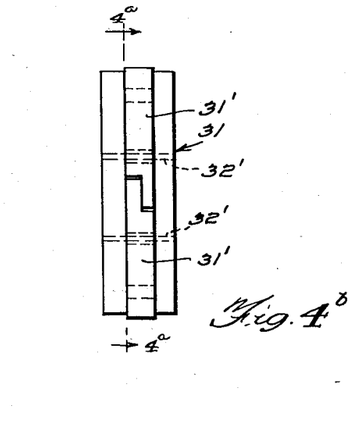
Figures 6, 7:
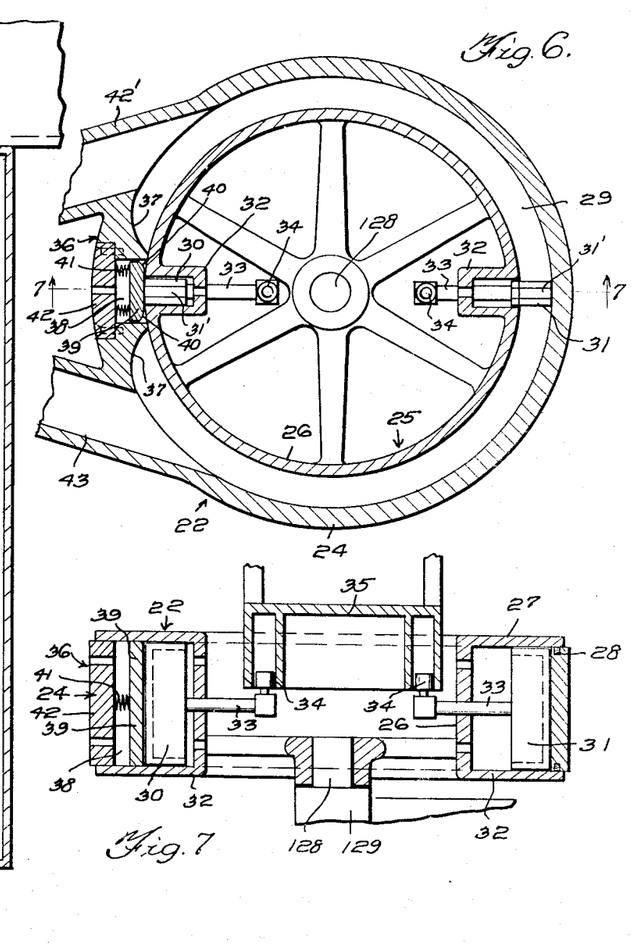
Fig. 6 is a horizontal section taken on line 6—6 of Fig. 3.
Fig. 7 is a vertical section taken on line 7—7 of Fig. 6.
Figure 8:
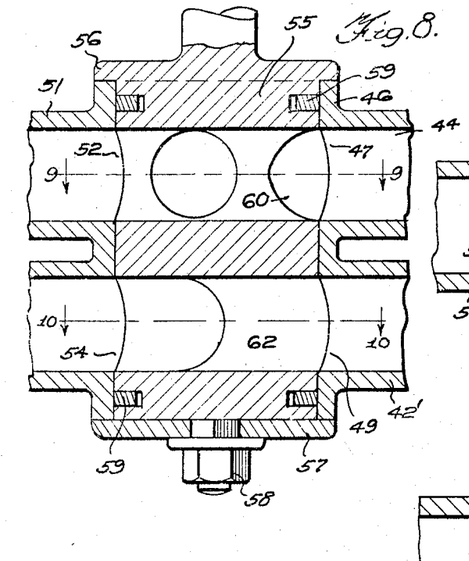
Fig. 8 is a longitudinal vertical section taken on line 8—8 of Fig. 4.
Figure 9:
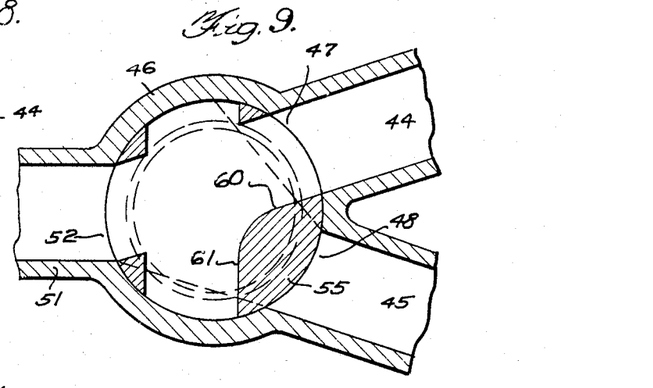
Fig. 9 is a horizontal section taken on line 9—9 of Fig. 8.
Figure 10:
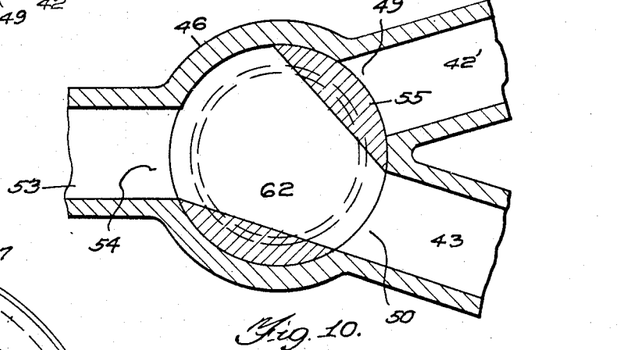
Fig. 10 is a similar view taken on line 10—10 of Fig. 8.

As more clearly shown in Figs. 4 and 6, the numeral 42' designates a pipe which leads into the casing 24 upon one side of and adjacent to the abutment 36, while a pipe 43 leads into this casing adjacent to and upon the opposite side of the abutment. Pipes 44 and 45 lead into the ends of the pipes 42' and 43, respectively, and, hence, are adapted to discharge into the casing 24, upon opposite sides of and adjacent to the abutment 36. The pipes 44 and 45 are pressure supply pipes, while pipes 42' and 43 are outlet or exhaust pipes. The pipes 44 and 45 converge forwardly and lead into a cylindrical vertically arranged valve casing 46, through ports 47 and 48, respectively.

The lower pipes 42' and 43 converge forwardly and lead into the valve casing 46, through ports 49 and 50, respectively. A pressure supply pipe 51 leads into the valve casing 46, opposite the ports 47 and 48, and in the elevation of the same, through a port 52. This pipe 51 leads into the discharge side of the pump casing 23, upon one side of the abutment 36, thereof (Fig. 5) and pipe 53 leads into the valve casing 46 through a port 54, and this port is opposite to the ports 49 and 50, and at the same elevation. The pipe 53 leads into the intake side of the pump casing 23, upon the opposite side of the abutment.

Mounted to turn within the valve casing 46 is a valve body or plug 55, having a flange 56 engaging the top of the valve casing, and a cap 57, at its lower end, engaging the bottom of the valve casing and held in position by a bolt 58, or the like. Suitable packing 59 is employed between the valve body and valve casing. The valve body is provided at the elevation of the ports 52, 47, 48, with angularly disposed ports 60 and 61, which intersect, as shown. The port 60 is adapted to establish communication between the ports 52 and 47, while port 61 is adapted to establish communciation between the ports 52 and 48. The valve body is provided in its lower portion and in the plane of ports 54, 49 and 50, with a port 62, increasing in width, forwardly. This port is adapted to alternately establish communication between port 54 and 49; and port 54 and 50. It is, thus, seen that when the valve body 55 is in the adjusted position shown in Fig. 9, with the port 60 connecting ports 52 and 47, and port 62 connecting ports 54 and 50, fluid under pressure will be discharged from the pump element 21, through pipe 51, port 52, port 60, port 47, pipe 44, through the rear end of pipe 42' and into the motor casing 22, driving the rotor clock-wise (Fig. 4). At the same time, the fluid is discharging from the opposite side of the motor casing 24, through pipe 43, and will pass through port 50, port 62, port 54, and through pipe 53, to the intake side of the pump casing. Fluid pressure from the pump is, therefore, transmitted to the motor to drive its rotor in one direction, and it is obvious that by turning the valve body 55 so that port 61 will register with ports 52 and 48, and port 62 will register with ports 54 and 50, the rotor of the engine will be driven in the opposite direction. The extent of movement of the valve body 55 in opposite directions is limited by a lug 63, rigidly secured thereto, and adapted to engage stop lugs 64, and 65, as clearly shown in Fig. 4. The valve body is connected with a vertical shaft 66, for turning the same, as will be explained.

Figure 5:
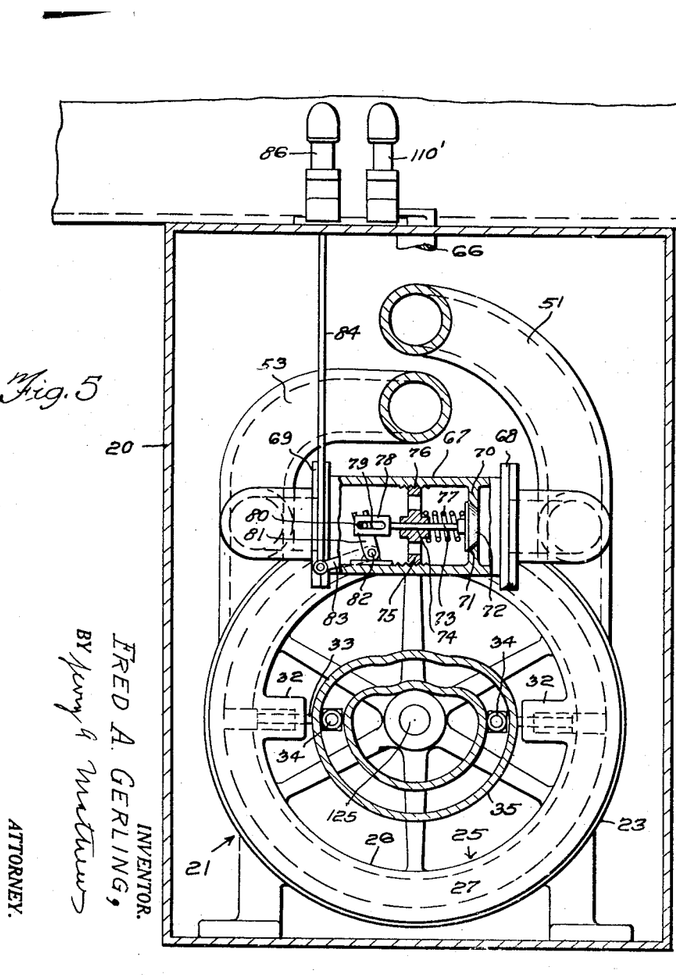
Fig. 5 is a transverse vertical section taken on line 5—5 of Fig. 3.

A by-pass device is connected between the pipes 51 and 53 (See particularly Fig. 5). This device embodies a cylindrical casing 67, connected at one end with a coupling 68, which is connected with the pipe 51, and at its opposite end with a coupling 69, connecting with the pipe 53. Arranged within the casing 67 is a wall or web 70, extending transversely of the same, and having an opening or valve seat 71, to be engaged by a valve 72, carried by a valve stem 73. This valve stem is slidably mounted within an opening 74, formed in a spider 75, having screw-threaded engagement with the cylindrical casing 67, as shown at 76, to be longitudinally adjustable therein. A compressible coil spring 77 surrounds the stem 73, and is confined between the spider and the valve 72, and serves to seat the valve. By longitudinally adjusting the spider with respect to the casing 67, the tension of the spring 77 may be regulated.

A head 78 is secured to the forward end of the stem 73, and has an elongated slot 79 formed therein, receiving a pin 80, mounted upon a crank 81. This pin normally engages the forward end wall of the slot 79. The crank 81 is rigidly mounted upon a rock-shaft 82, extending into the casing 67, and this rock shaft is turned by a crank 83, disposed exteriorly of the casing 67. The crank 83 has pivotal connection with a rod 84, extending upwardly for pivotal connection at 85 (Fig. 3) with a treadle 86. With the parts shown in position in Fig. 5, with the valve 72 seated, should excessive pressure develop in the pipe 51, the valve 72 will be automatically unseated, and the pressure by-passed into the pipe 53, and the fluid returned to the intake side of the pump. When it is desired to prevent this by-pass of fluid pressure, the valve 72 may be positively held seated by the operator depressing the rear or head end of the treadle 86, thereby raising the rod 84, and turning the rock-shaft 82, clock-wise, (Fig. 5) causing the pin 80 to engage the rear end wall of the slot 79, thereby holding the valve 72 seated. The operation of the rotor of the motor may be stopped, while the rotor of the pump is driving at the same speed, and this is accomplished by depressing the forward end of the treadle 86 so that the valve 72 is sufficiently opened to by-pass the fluid pressure from the pressure supply pipe 51, to return pipe 53. The speed of rotation of the rotor of the motor may be regulated to any number of speeds by opening the valve 72 sufficiently to by-pass a portion of the fluid pressure back to the intake side of the pump. By this means, a highly elastic form of transmission is obtainable.

Figure 12:
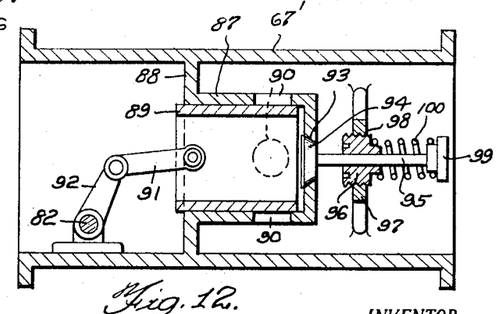
Fig. 12 is a central longitudinal section through a modified form of by-pass valve structure.
Figure 13:
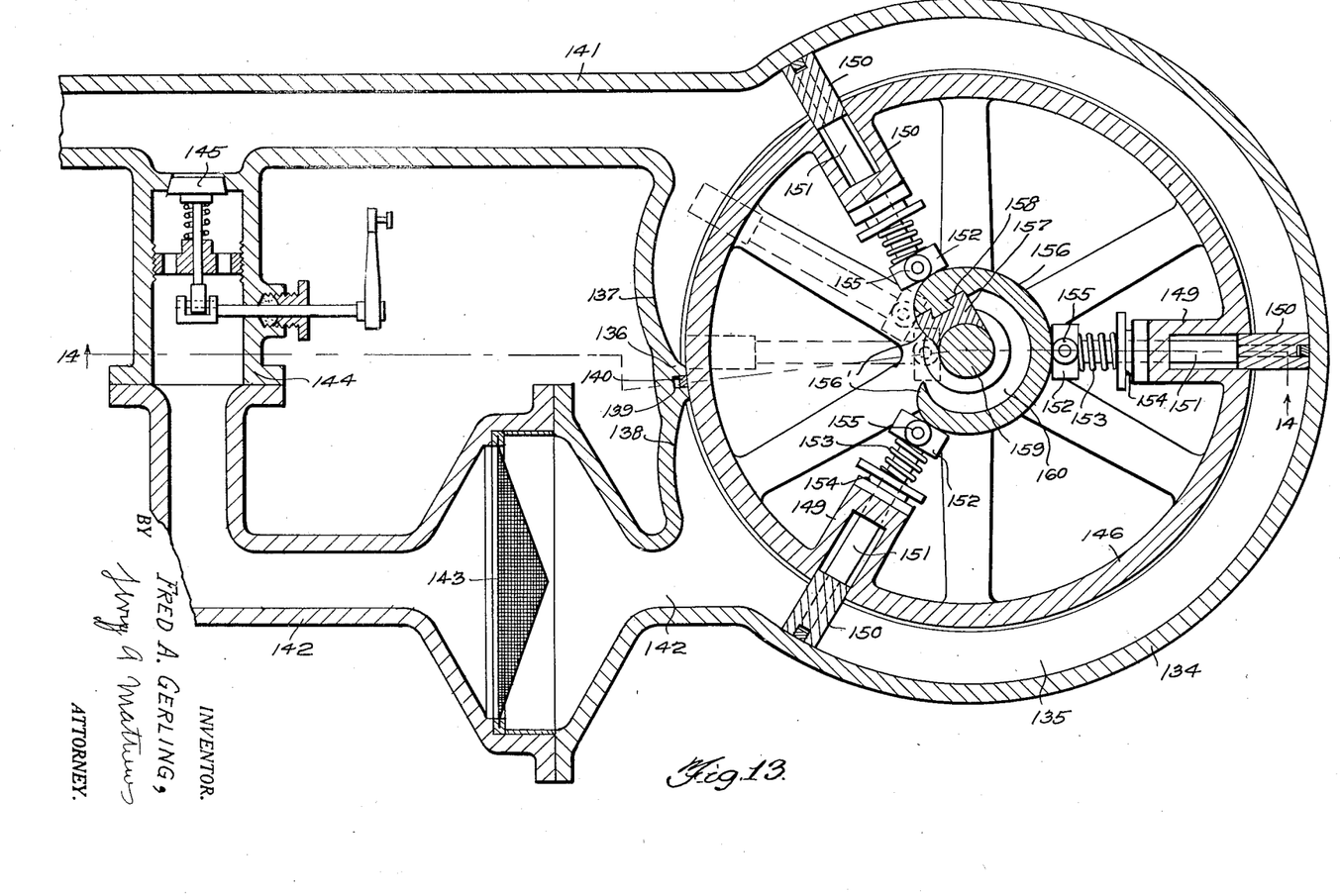
Fig. 13 is a central horizontal longitudinal section through a modified form of engine.
Figures 14, 15, 16:
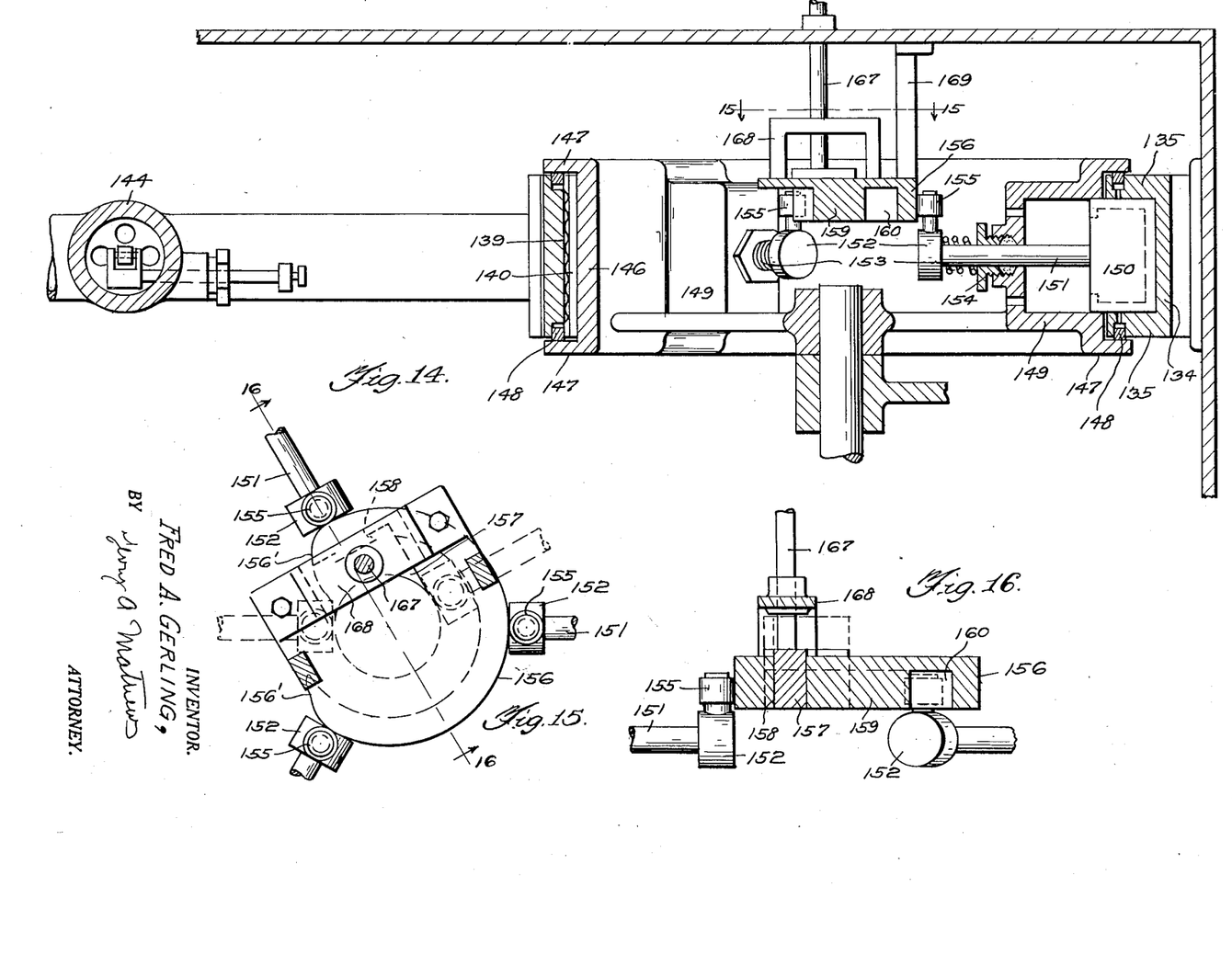
Fig. 14 is a vertical section taken on line 14—14 of Figure 13.
Fig. 15 is a section taken on line 15—15 of Fig. 14.
Fig. 16 is a section taken on line 16—16 of Fig. 15.

In Fig. 12, I have shown a modified form of by-pass device to be connected between the pipes 51 and 52 in place of the device shown in Fig. 5, including the casing 67. The modification shown in Fig. 12 embodies a casing 67' to be substituted for the casing 67, (Fig. 5). Within the casing 67' is a cup-shaped housing 87 carried by a partition or web 88. This housing is, preferably, cylindrical and has its forward end open for slidably receiving a sleeve valve 89, having both ends open. This sleeve valve is adapted to cover ports 90. The sleeve valve is adapted to be moved forwardly by a link 91, pivoted to a crank 92, corresponding to the crank 81 (Fig. 5) and this crank 92 is carried by the rock shaft 82. The forward end of the housing 87 is provided with an opening or valve seat 93, to be engaged by a valve 94, carried by a stem 95, slidable within a collar 96, longitudinally adjustably mounted within a spider 97, by screw-threaded engagement therewith, as shown at 98. This stem carries a head 99, engaged by a compressible coil spring 100, the tension of which is regulated by adjustment of the collar 96. The opening of the valve 94 is entirely automatic and depends upon the tension of the spring 100, this valve opening when the pressure in the supply pipe 51 becomes excessive. The pressure may be by-passed through the device by forcing the forward end of the treadle 96, downwardly, thereby turning the rock-shaft 82 counter clock-wise, (Fig. 12) to draw the sleeve valve 89 forwardly so that it partly or wholly uncovers ports 90, thereby stopping the rotation of the rotor of the engine, or regulating its speed.

Figure 11:
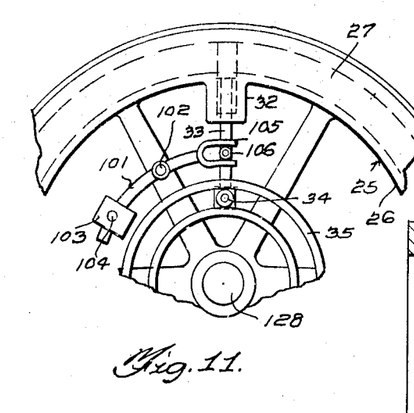
Fig. 11 is a fragmentary side elevation of a rotor, showing a piston balancing means associated therewith.

In Fig. 11, I have shown a slight modification of the rotor for use in both pump and motor. This modification resides in the provision of centrifugal operating means to balance the action of the piston, due to centrifugal force. This balancing means embodies a lever 101, pivoted at 102 upon one spoke of the rotor. This lever is provided with a counter-weight 103, which is longitudinally adjustably mounted upon the same, and is adapted to be clamped to the lever in the adjusted selected position by a bolt 104. The opposite end of the lever has a fork 105, receiving therein a roller 106, carried by the rod 33. It is, thus, seen that the tendency of the piston to move outwardly by centrifugal force may be balanced or neutralized by the action of the weight 103, tending to move outwardly by centrifugal force, thus relieving the cam and associated elements of excessive strain in shifting the piston.

Means are provided to turn the shaft 66 of the valve body 55 (Figs. 3 and 8), comprising a crank 107, rigidly attached to the upper end of the shaft 66, and having pivotal connection with a rod 108, which is pivoted at 109, with a crank or arm 110, rigidly attached to the treadle 110' and depending therefrom. This crank is pivotally supported at 111, upon a vertical lug 112, as shown. It is, thus, seen that the valve body 55 may be turned to either position by manipulation of the treadle 110'.

I provide means to prevent the sudden rise of pressure within the supply pipe 51, comprising a closed tank 113, having a pipe 114, leading into the pipe 51. The tank 113 is partly filled with a liquid which completely fills the pump and engine, and the circulating system. This tank is provided at its top with a screw-threaded opening for receiving a tubular coupling 115, carrying a depending arm 116, to the lower end of which is pivoted, at 117, a vertically swinging arm 118, carrying a float 119.

A valve rod 120 is pivoted to the arm 118, and operates through guides 121, and this valve rod carries a tapered valve 122, seating upwardly to close an air vent opening 123. A manually adjustable valve or petcock 124 may be secured to the top of the coupling 115. Any sudden rise of pressure within the pipe 51 will cause the oil to rise within the tank 113, as the air is then free to escape through the opening 123. As the level of the oil rises, the float 119 is elevated and valve 122 covers the port 123, preventing the escape of air, which may now be compressed by the rising action of the oil.

The rotor 25, of the pump 21, is driven by a horizontal shaft 125, operating within a bearing 126 and a packing gland 127. The rotor 25 of the motor 22 is rigidly connected with a vertical shaft 128, operating within stationary bearings 129 and 130. A horizontal bevel gear 131 is driven by the shaft 128 and engages a vertical bevel gear 132, rigidly mounted upon a shaft 133. The shaft 125 may be connected with the engine of an automobile to be driven thereby, while the shaft 133 may be connected with the differential gearing.

A modified form of motor is shown in Figs. 13 to 16, inclusive. This motor embodies an annularly curved casing 134, in the form of a channel having sides 135. This casing is stationary and is provided with a stationary abutment 136, having inclined faces 137 and 138. The abutment is provided with a groove 139, receiving a spring-pressed abutment element 140. A fluid pressure supply pipe 141 leads into the casing 134 upon one side of the abutment, while an exhaust or outlet pipe 142 leads into the casing 134 upon the opposite side of the abutment, and has a straining device 143 connected therein, as shown.

A by-pass device 144 connects the pipes 141 and 142, and embodies a spring-pressed valve 145, which may be manually opened, as explained in connection with the first form of the invention. Mounted within the casing 134 is a rotor embodying a rim 146, having flanges 147, slidably engaging the outer sides of the channel casing 135, with suitable packing 148, arranged between these parts. The rotor is provided with radial guide housings 149, slidably receiving radial reciprocatory pistons 150 connected with radial rods 151. These rods are provided at their inner ends with heads 152, engaged by compressible coil-springs 153, confined between the heads 152 and gland elements 154. The heads 152 carry rollers 155, arranged to normally travel upon the outer surface or periphery of a stationary cam 156. This cam is provided with a cam extension 157, having a dove-tailed sliding connection with said cam, as shown at 158, so that the cam extension is movable vertically in an upward direction with relation to the cam. The cam further embodies a stationary cylindrical part 159, forming with the peripheral portion of the cam, a curved passage 160. The rollers 155 normally engage the outer surface of the periphery of the cam and when so engaging, retain the pistons 150 in the projected positions, until they approach the abutment 136, when the rollers travel inwardly over the inclined end 156', and are retracted by the springs 153, to properly clear the abutment. The cam extension 157, when in the lowered position, within the path of travel of the rollers, serves to shift the rollers outwardly so that they are conducted to the outer surface of the periphery of the cam 156.

When the cam extension 157 is elevated out of the path of travel of the rollers 156, these rollers will enter the curved passage 160, and the pistons will not be projected, and, hence, the rotation of the rotor will stop. The cam extension 157 is raised and lowered by means of a rod 167, slidable through a bracket 168, which serves to limit the upward travel of the cam extension. The cam 156 is stationary, as stated, and may be supported by an arm 169.

The operation of the apparatus shown in Figs. 1 to 12, inclusive, is as follows:

The pump 21 and motor 22, and pipes connecting the same, are filled with a fluid, such as oil, which also partly fills the expansion tank 113. This oil may be replenished through the tank 113. The pump is connected to the motor of an automobile, or the like, and may be driven at a constant desired speed. By opening the manually operated valve 72, (Fig. 5) the oil may be by-passed through the casing 67, and caused to circulate through the pump without driving the motor. When the valve 72 is seated, and the valve body 55 adjusted to the position shown in Fig. 9, it is obvious that the oil under pressure will be fed through pipe 51, and through pipe 44, (Fig. 9) to one side of the motor casing 24, driving the rotor clock-wise (Fig. 6). Should excessive pressure develop in the pipe 51, the valve 72 will automatically open, thus relieving such excess pressure by the return of the oil to the intake side of the pump.

The rotor of the motor may be driven in reverse direction by the manipulation of the valve body 55, as explained. Any sudden rise of pressure, not sufficient to open the valve 72, is automatically taken care of by the tank 113 and associated elements. Upon this sudden rise of pressure, the oil will rise in tank 113, and the air is then free to vent through the opening 123. As the oil continues to rise in this tank, the float 119 will seat the valve 122, thus trapping the air and holding the same so that it may be compressed by the oil, if it continues to rise within the tank 113.

In view of the foregoing description, it is thought that the construction and operation of the invention has been made clear.

It is to be understood that the forms of my invention, herein shown and described, are to be taken as preferred examples of the same, and that various changes in the shape, size and arrangement of parts, may be resorted to, without departing from the spirit of my invention, or the scope of the subjoined claims.

Having thus described my invention, what I claim is:

1. In hydraulic transmission, a rotary pump, means to drive the pump, a rotary motor, means driven by the rotary motor, a pressure supply pipe connected with the outlet side of the pump, an inlet pipe connected with the intake side of the pump, said pipes having their ends disposed at different elevations, a pair of inlet pipes leading into the motor at different points for driving the same in opposite directions and having their ends disposed in substantially the elevation of the pressure supply pipe of the rotary pump, a pair of outlet pipes leading into the inlet pipes to receive exhaust fluid when the motor is operated in opposite directions and having their ends disposed at substantially the elevation of the end of the inlet pipe of the rotary pump, a common valve casing connecting the pressure supply pipe of the rotary pump with the inlet pipes of the rotary motor, and the inlet pipe of the rotary pump with the outlet pipes of the rotary motor, a single valve body mounted to turn within the common valve casing and provided in its upper portion with a plurality of intersecting ports disposed generally at a right angle to each other and so arranged that the pressure supply pipe from the rotary pump may be alternately placed into communication with the inlet pipes from the rotary motor, said valve body being provided at an elevation beneath the intersecting ports with a transversely tapered port adapted to alternately place the inlet pipe of the rotary pump into communication with the outlet pipes of the rotary motor, and means engaging the top of the valve body to turn the same.

2. In hydraulic transmission, a rotary pump, inlet and outlet pipes leading into the rotary pump at different points, a rotary motor, inlet pipes leading into the motor at different points, outlet pipes leading into the motor at different points, valve means to alternately place the outlet pipe of the pump into communication with the inlet pipes of the motor, and the inlet pipe of the pump into communication with the outlet pipes of the motor, a by-pass device connected across the outlet and inlet pipes of the rotary pump, said by-pass device including a tubular casing having one end open and provided near its opposite end with an internally arranged annular flange constituting a valve seat, a spider mounted within the central portion of the tubular valve casing and provided with an apertured hub, a valve arranged within the tubular casing disposed to engage the valve seat, a valve rod connected with the valve and slidable within the apertured hub, a compressible coil spring surrounding the valve rod and disposed between the apertured hub and valve, a longitudinally slotted head arranged upon the opposite side of the spider with relation to the spring and secured to the valve rod, a rock shaft extending into the tubular valve casing, a crank mounted within the valve casing and secured to the rock shaft and carrying a pin operating within the elongated slot of the head, a second crank secured to the rock shaft exteriorly of the tubular valve casing, a pivoted pedal, and a rod pivotally connecting the pedal and the last named crank.

3. In hydraulic transmission, a rotary pump, inlet and outlet pipes leading into the rotary pump at different points, a rotary motor, inlet pipes leading into the motor at different points, outlet pipes leading into the motor at different points, valve means to alternately place the outlet pipe of the pump into communication with the inlet pipes of the motor, and the inlet pipe of the pump into communication with the outlet pipes of the motor, a by-pass device connected across the inlet and outlet pipes of the rotary pump including a valve casing having a valve seat arranged interiorly thereof near one end and its opposite end open, said valve casing having a central portion of its periphery internally threaded, a spider mounted within the valve casing and having its periphery screw-threaded to engage with the screw-threaded portion of the valve casing so that the spider may be longitudinally adjusted within the valve casing, said spider having an apertured hub, a valve arranged to engage the valve seat, a valve rod slidable within the apertured hub and connected with the valve, a spring surrounding the valve rod and disposed between the apertured hub and valve, a head secured to the end of the valve rod upon the opposite side of the spider with respect to the spring and having an elongated slot, a rock shaft extending into the valve casing, a crank mounted within the valve casing and secured to the rock shaft and having a pin to enter the elongated slot of the head, a crank arranged exteriorly of the valve casing and secured to the rock shaft, a rod connected with the exteriorly arranged crank, and manually operated means to reciprocate the rod.

4. In hydraulic transmission, a rotary pump, inlet and outlet pipes leading into the rotary pump at different points, a rotary motor, inlet pipes leading into the motor at different points, outlet pipes leading into the motor at different points, valve means to alternately place the outlet pipe of the pump into communication with the inlet pipes of the motor, and the inlet pipe of the pump into communication with the outlet pipes of the motor, a by-pass device connected across the inlet and outlet pipes of the rotary pump including a valve casing having a valve seat, a valve element engaging the valve seat and automatically opening toward the inlet pipe of the rotary pipe when the pressure within the outlet pipe of the rotary pump reaches a selected point, a valve stem connected with the valve element and provided with a head having an elongated slot, a spring surrounding the stem and engaging the valve element and serving to force the same toward the valve seat, and a pivoted member carrying a pin arranged within the elongated slot of the head, the arrangement being such that the pivoted member may be quickly swung in one direction to bring the pin into engagement with one end wall of the elongated slot so that the valve element will be positively held upon its seat and swung in an opposite direction to bring the pin into engagement with the opposite end wall of the slot to shift the valve element from its seat, said pin when engaging said opposite end wall of the slot not interfering with the automatic opening action of the valve element.

In testimony whereof I affix my signature.

FRED A. GERLING.